United States Patent Office 3,249,176
Patented May 3, 1966

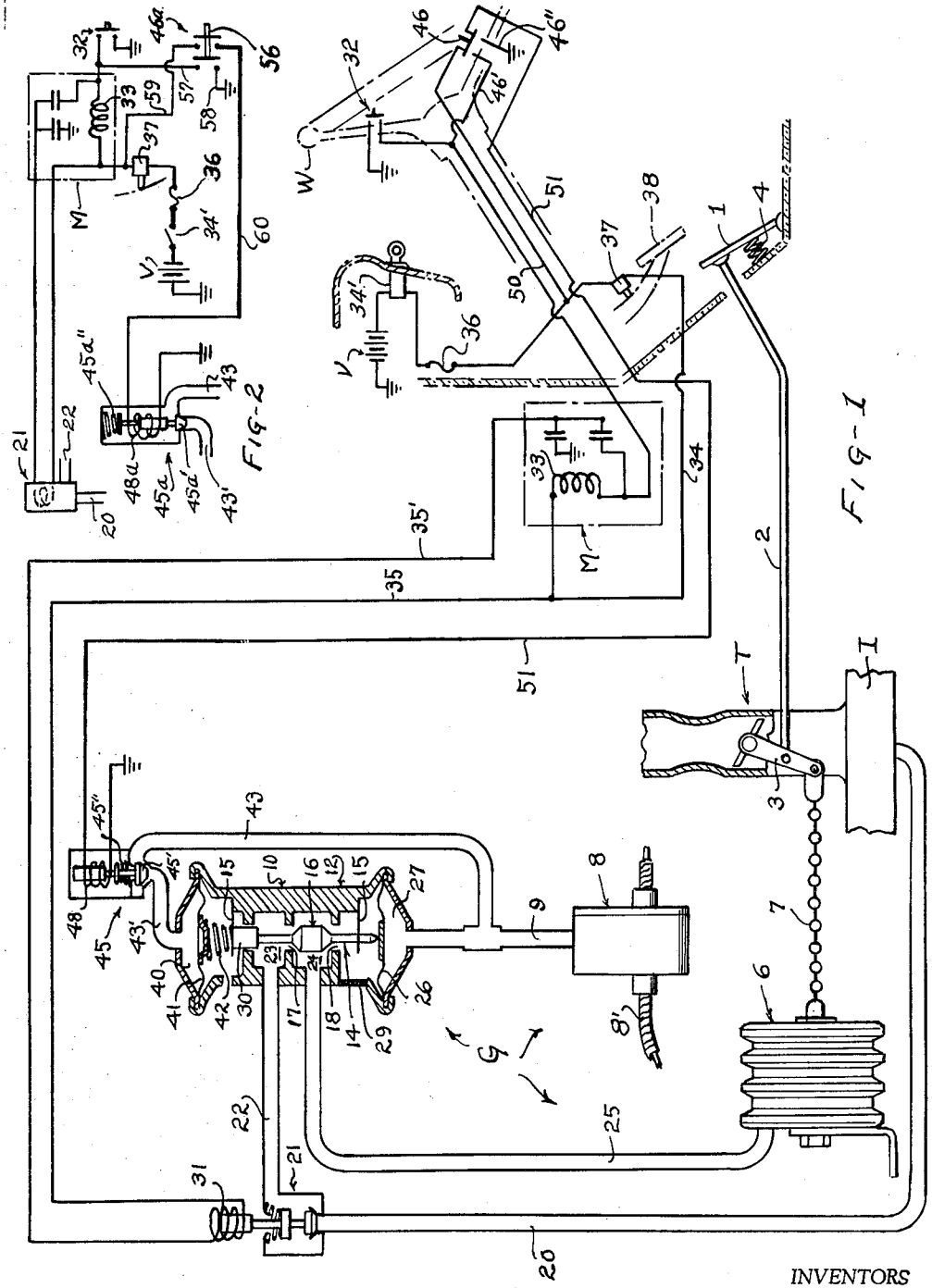

3,249,176
MOTOR VEHICLE SPEED REGULATING
MECHANISMS
Robert L. Dangler, Shaker Heights, and Richard R.
Maruca, Wickliffe, Ohio, assignors to Curtiss-Wright
Corporation, a corporation of Delaware
Filed May 11, 1964, Ser. No. 366,519
5 Claims. (Cl. 180—82.1)

This invention relates to improvements in engine speed control or governing systems of known types adapted especially for enabling automatic maintenance of desired automotive vehicle speeds despite changes in load, e.g., road gradient. An object of the invention is to enable the driver of a vehicle equipped with such a control system as mentioned safely to set or select various governing speeds with a minimum of effort. A specific object is to provide mechanism which will enable setting of governor speeds without ever having to exceed a desired speed in the process of conditioning the governor for automatically maintaining substantially or approximately that speed.

A further object is to simplify and reduce the cost of governor control mechanisms arranged generally as in U.S. Patents 2,990,825, Fuller et al., July 4, 1961, and 3,023,828, Fuller et al., March 6, 1962, both owned by the assignee of the present application, while providing fail-safe operation under all circumstances which may reasonably be expected to occur.

Other objects will become apparent from the following description of typical embodiments as shown in the accompanying drawing, wherein:

FIG. 1 is a schematic view showing the present improvement in combination with a vehicle speed regulator or automatic governor mechanism operating essentially as a pneumatic amplifier.

FIG. 2 is a partial schematic view showing a modification of or alternative for a control system generally in accordance with FIG. 1.

As shown in FIG. 1 an engine control member such as a throttle valve T is shown as arranged for conventional "manual" control via an accelerator pedal 1 connected by a link 2 and operating arm 3 to move the throttle valve toward open position against the force of a suitable return spring as suggested at 4. The automatic governor mechanism G, as illustrated, includes a servomotor or servo 6 (e.g., flexible bellows as in the above identified patents) also connected as by a one-way-operating link 7 (e.g., bead chain) to move the throttle as from its illustrated engine-idling position toward fully open positions and hold it in required governing positions as chosen by the driver of the vehicle. Servo 6 is operated by engine vacuum acting in a direction to allow return of the throttle to idling position.

The governor mechanism G has for example speed responsive means such as a rotary fluid pressure generator unit 8 (e.g., as in said patents or any suitable alternative therefor) which in order to enable production of output pressure varying as a function of engine speed or particularly vehicle speed can be connected to an output portion of vehicle transmission (not shown) as by a flexible drive shaft 8'. Operation of pressure generator 8 or the like thereby maintains elastic fluid (air) pressure in an output passage 9 of unit 8 varying for example as the square of the speed of the rotary input of the generator.

The governor mechanism G as shown further includes a pilot valve unit 10 arranged to control the application of operating fluid pressure, e.g., engine vacuum, to the servo 6, generally as in said patents. The unit 10, as shown, includes a valve body 12 and a valve plunger 14 (hereinafter pilot valve) supported on body 12 as by cantilever leaf springs 15 for substantially friction-free or floating movement of a plug portion 16 in modulating relation to associated valve ports 17 and 18 but always out of contact therewith during governor operation.

Engine vacuum from manifold I is connected through a tube or passage 20, an air valve unit 21 and a tube or passage 22 to a vacuum chamber 23 in valve body 12, thence via valve port 17, air chamber 24 and tube or passage 25 with the working chamber of the servo 6. As in said patents the elastic fluid output (varying with speed) of pressure generator 8 acts on one end of the pilot valve 14 via a flexible diaphragm 26 in a suitable chamber 27 in opposition to biasing forces, applied oppositely and continuously to the pilot valve as will be explained, continuously to meter the operating fluid of servo 6.

Air chamber 24 is connected via the valve port 18 and a filter 29 to atmosphere; and as the pilot valve plug 16 moves (downwardly as shown) to increase vacuum intensity in the servo 6, by further opening port 17, it further restricts the atmosphere-connected port 18.

To compensate for variations in engine vacuum acting axially on the plug portion of pilot valve 14 and tending to close port 17 a piston portion 30 of pilot valve 14 nearly closes a cylindrical opening in a portion of the wall of the vacuum chamber 23 but always out of contact with said wall.

The air valve 21, as shown, is arranged to connect the engine manifold with vacuum chamber 23 and disconnect it therefrom by energization and deenergization of a solenoid 31, thus enabling activation and inactivation of the governor mechanism G at the option of the driver as in said patents.

In the present electrical control mechanism the air valve 21 is opened when a push-button-type switch 32 (hereinafter usually resume-speed switch mounted as on the steering wheel W) is momentarily closed in order to energize a holding coil 33 of a magnetically-locked-in switch mechanism M. Said coil 33 is connected to the vehicle battery V or other power source through a conductor 34 which, as in Patent 3,023,828, preferably includes the usual ignition switch 34', a protective fuse 36 and a normally closed switch 37 arranged to be opened as by a brake or clutch pedal 38 to deenergize the governor mechanism and return full control of the engine to the driver whenever he performs operations preparatory to stopping the vehicle. As will be apparent, energization of coil 33 closes associated conventionally arranged switch contacts, thereby to continue to supply electrical energy to the air valve coil 31 through conductors 35 and 35' after the resume-speed switch 32 has been released.

Speed selection or setting in accordance with the illustrated form of the present system is accomplished by yieldably applying a biasing force to the pilot valve 14 (balancing the pressure in diaphragm chamber 27) principally as a function of the then existing output of the speed responsive unit 8. As shown in FIG. 1 a second diaphragm chamber 40 disposed oppositely of diaphragm chamber 27 in relation to the pilot valve 14 and containing or embodying a flexible diaphragm 41 is arranged to act on the pilot valve via a reference-force-transmitting coil spring 42 bearing thereon at one of its ends. Chamber 40 is connected to the output passage 9 of unit 8 by a tube or passage 43, 43' adapted to be closed as by a lock-in valve unit 45 so as releasably to trap pressure fluid in the diaphragm chamber 40 at selected particular-speed-function-representing pressure values.

It will be evident from inspection of FIG. 1 that, assuming the lock-in valve unit 45 is in its normally open condition, the pilot valve 14 will steadily occupy slightly different valve-port-restricting positions with very small changes in driving speed under "manual" control. Then when the valve 45 is closed, trapping fluid at a predetermined pressure in chamber 40, any increase in load, as by encountering uphill driving after driving on a horizontal roadway, will produce decreased speed signal pressures in the lower diaphragm chamber 27, resulting in corresponding downward movements of the pilot valve 14 and increased fuel to the engine. Automatic governing operation in event of decrease in load is of course the opposite of that just above described.

Normally open lock-in valve unit 45, as shown in FIG. 1 wherein a spring 45″ tends to lift the valve plug 45′ off its seat, is operated to set or select the desired governing speed when the driver, through notation of the then existing vehicle speed on the vehicle speedometer, moves a switch member 46 from its normal (e.g., spring urged) illustrated position wherein the solenoid coil 48 is energized to close the lock-in valve unit 45 via conductors 50 and 51 into a position, not shown, wherein the relay coil 33 is energized via conductors 46′ and 46″ (in case said relay coil has not previously been energized by closing of push button switch 32 to open the air valve 21) and then, upon allowance of return of switch member 46 to its normal illustrated position, to close the lock-in valve 45 and retain it closed.

If the driver wishes to cruise faster than the set speed he overides the governor "manually" via accelerator pedal 1; meanwhile momentarily deactivating portion 48, 50, 51 of the electrical system by moving push button member 46 out of its illustrated closed position and then allowing return of the switch member 46 to its illustrated position to reset the speed.

If the driver wishes to reset the governor at a slower crusing speed than it happens to be set at any time, he decelerates the vehicle by means of the brake 38 which deactivates the governor by brake switch 37 then repeats the just above outlined procedure, releasing switch member 46 to reenergize solenoid 48 when the vehicle has decelerated to the desired lower speed.

The lock-in valve plug 45′ of valve unit 45 in the arrangement according to FIG. 1 is returned to its normal open position by the spring 45″ when the ignition switch 35 is operated to shut down the engine, but, because the control circuit 50, 51 dominated by push-button switch 46 does not include the normally closed switch 37, the valve 45 remains closed (i.e., in governed-speed-selecting position) whenever engine control is temporarily returned to the driver as by the opening of switch 37 and in case the driver overrides the governor mechanism in the operation of passing other vehicles.

In place of the pilot-valve-biasing spring 42 a metal bellows with any desired built-in spring rate or combination of spring rates can be used in lieu of the diaphrgam chamber 40, etc.; and suitable means (not shown) can be used to vary the effective pilot-valve-biasing spring force thereby to enable (e.g.) adjustment of the optimum governing range. By way of augmenting the biasing spring 42 the leaf springs 15 or one of them can be designed or shaped (not shown) so as initially or at zero vehicle speed to hold the valve plug portion 16 in sealing relation to the upper valve port 17 and until the vehicle speed has reached a desirable value for commencement of automatic governing. Thereby if air valve 21 is opened by closing of switch 32 while the vehicle is at standstill (or is traveling at an undesirably slow speed for initiation of automatic governing) the vehicle will not be automatically accelerated at a dangerously high rate.

FIG. 2 CONTROLS

If for example in driving between temporary destinations (e.g., rest areas as on turnpikes or when stopping overnight) it is desired that the governor mechanism will, when reactivated, operate at the last selected speed setting (speed memory) the controls can be modified in various ways, one modification being shown in FIG. 2. Therein the control elements involving relay M, air valve 21 and resume speed switch 32 are shown essentially the same as in FIG. 1, but the lock-in valve unit 45a is normally closed (as by spring 45a″ acting on plug 45a′) and solenoid coil 48a is controlled to be energized—as by normally open, double pole switch unit 46a—only when the governing speed is to be reset.

In FIG. 2, as already indicated, switch member 56 of unit 46a is shown in a neutral or "off" position. The governor mechanism G is conditioned for operation at the prevously set speed by momentarily closing resume speed switch 32, thus energizing holding relay coil 33 and opening the air valve 21. If the driver, in preparing to resume automatic governing operation but at a new speed, has neglected to close the switch 32 the relay coil 33 will nevertheless be energized by operation of closing the switch unit 46a via ground line 57, 58. In the use of this modification the switch member 56 is held closed (energizing lock-in coil 48a via conductor 59, 60) until the vehicle under manual control, either during acceleration or deceleration, has arrived at the desired speed, whereupon release of the lock-in switch leaves the mechanism governing automatically at that speed. Opening of the brake switch obviously has no effect upon the lock-in coil 48a but only effects deenergization of the relay M etc., requiring reclosing of resume-speed switch 32 in order to continue automatic governing.

We claim:
1. In combination with an engine speed regulator or governor system for an automotive vehicle having manually operated means for stopping the vehicle and wherein a servomechanism including pilot means and servo means controlled thereby is operatingly connected to a control member of the engine to move said control member in at least one direction,
 (a) speed detecting means having a first output portion connected to the pilot means to move the latter in a direction to activate the servo to effect decreases in engine or vehicle speed,
 (b) said detecting means (a) having a second output portion connected to the pilot means and tending to effect movement thereof in the opposite direction as a function of increase in engine or vehicle speed,
 (c) an electrical power source,
 (d) electromagnetic means powered thereby including a circuit connected to said source and capable of rendering the servo active and inactive,
 (e) switch means in the circuit arranged to deenergize the electromagnetic means to inactivate the servo incident to operation of the manually operated means tending to stop the vehicle, and
 (f) electromagnetic means connected to said source (c) independently of said switch means (e) and capable of rendering the second output portion (b) inactive to produce any change in position of the pilot means incident to changes in engine or vehicle speed.

2. A speed control system for an automotive vehicle comprising:
 motor means to actuate a throttle and thereby increase and decrease vehicle speed;
 valve means connected with the motor means, the valve means including a valve member movable in one direction to cause the motor to operate so as to increase vehicle speed and movable in the opposite direction to cause the motor to operate so as to decrease vehicle speed;
 speed responsive means operable to generate a pressure which is a measure of vehicle speed;
 means connected with the pressure generating means and operable on the valve member in a direction tending to cause the valve member to move so as to decrease vehicle speed;
 a spring operable on the valve member in a direction tending to cause the valve member to move so as to increase vehicle speed;

a chamber including a force applying member which operably connects with and loads the spring;

fluid carrying means between said chamber and the pressure generating means for directly exposing the force applying member in the chamber to a pressure determined according to vehicle speed by the operation of the said speed responsive pressure generating means; and a valve in said fluid carrying means operable to trap pressure in said chamber whereby said spring may be loaded according to a selected vehicle speed.

3. A speed control system for an automotive vehicle comprising:

motor means to actuate a throttle and thereby increase and decrease vehicle speed;

valve means connected with the motor means, the valve means including a valve member movable in one direction to cause the motor to operate so as to increase vehicle speed and movable in the opposite direction to cause the motor to operate so as to decrease vehicle speed;

a first pressure chamber including a pressure responsive diaphragm operatively connected with the valve member for moving the valve member in the direction to decrease speed;

a second pressure chamber including a pressure responsive diaphragm operatively connected with the valve member for moving the valve member in the direction to increase speed;

speed responsive fluid pressure generating means for producing an outlet pressure which is a measure of vehicle speed;

conduit means extending from the outlet of the generating means to said first and second chambers; and a valve in the conduit means between the second chamber and the generating means operable to trap pressurized fluid in the second chamber and thereby provide for movement of the valve member in a direction to decrease speed upon an increase in pressure in the first chamber, and movement of the valve member in a direction to increase speed upon a decrease in pressure in said first chamber.

4. Mechanism according to claim 3 including spring means to load the valve in the fluid carrying means to an open position, and control means to hold such valve closed, the control means including manually operable means actuable to cause the valve to momentarily open.

5. Mechanism according to claim 3 including spring means to load the valve in the fluid carrying means to a closed position, and control means manually operable to momentarily open such valve.

References Cited by the Examiner
UNITED STATES PATENTS

| | | | |
|---|---|---|---|
| 2,948,271 | 8/1960 | Ignatjev | 123—102 |
| 2,968,377 | 1/1961 | Griffen | 192—3 |
| 3,062,310 | 11/1962 | McCathron et al. | 180—82.1 |
| 3,183,994 | 5/1965 | Goerke et al. | 180—82.1 |

A. HARRY LEVY, *Primary Examiner.*

BENJAMIN HERSH, *Examiner.*

E. E. PORTER, *Assistant Examiner.*